March 9, 1926.  1,576,076
A. W. WALKER
AIR BLAST SPRAYER OR DUSTER
Filed June 12, 1922 4 Sheets-Sheet 2
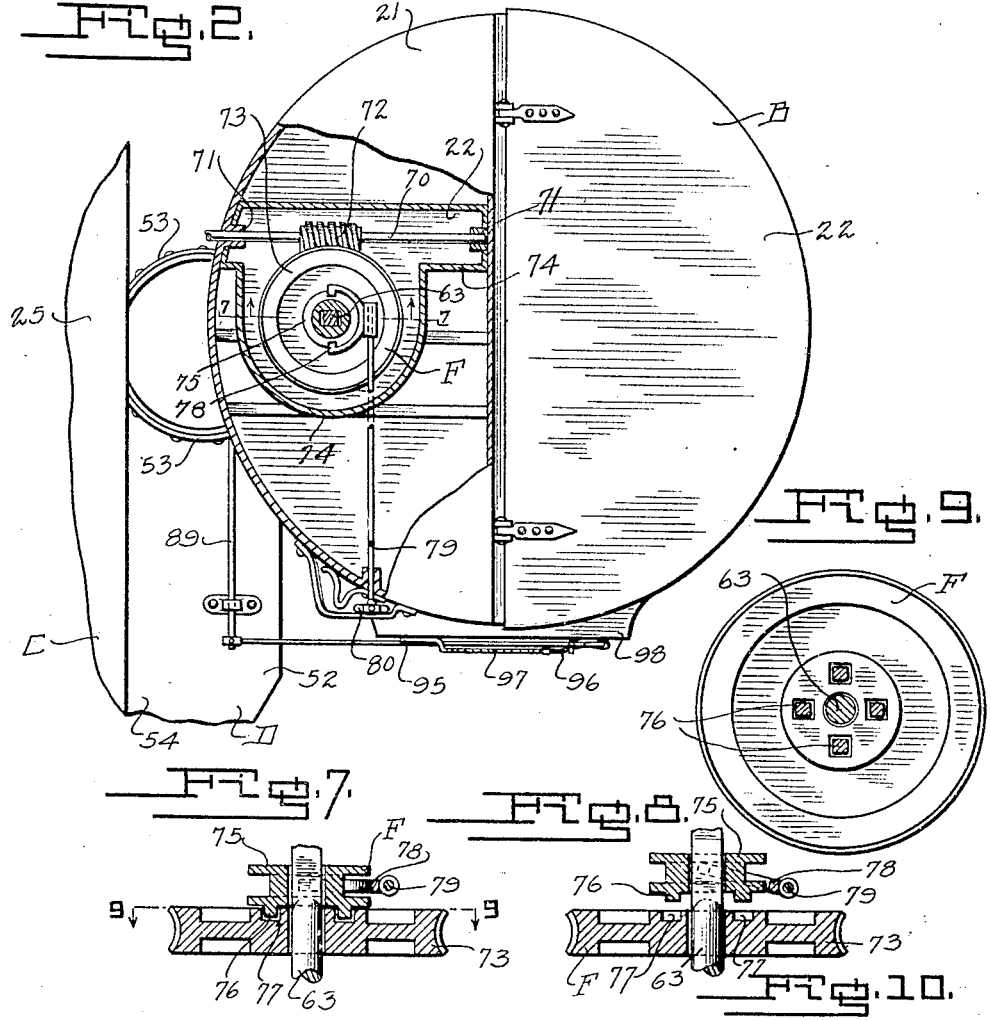
Inventor
Avery W. Walker
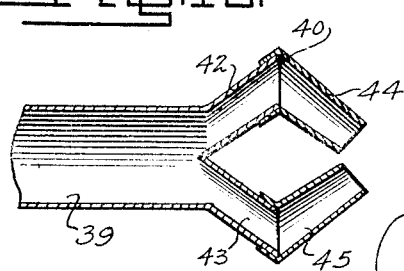
Attorneys

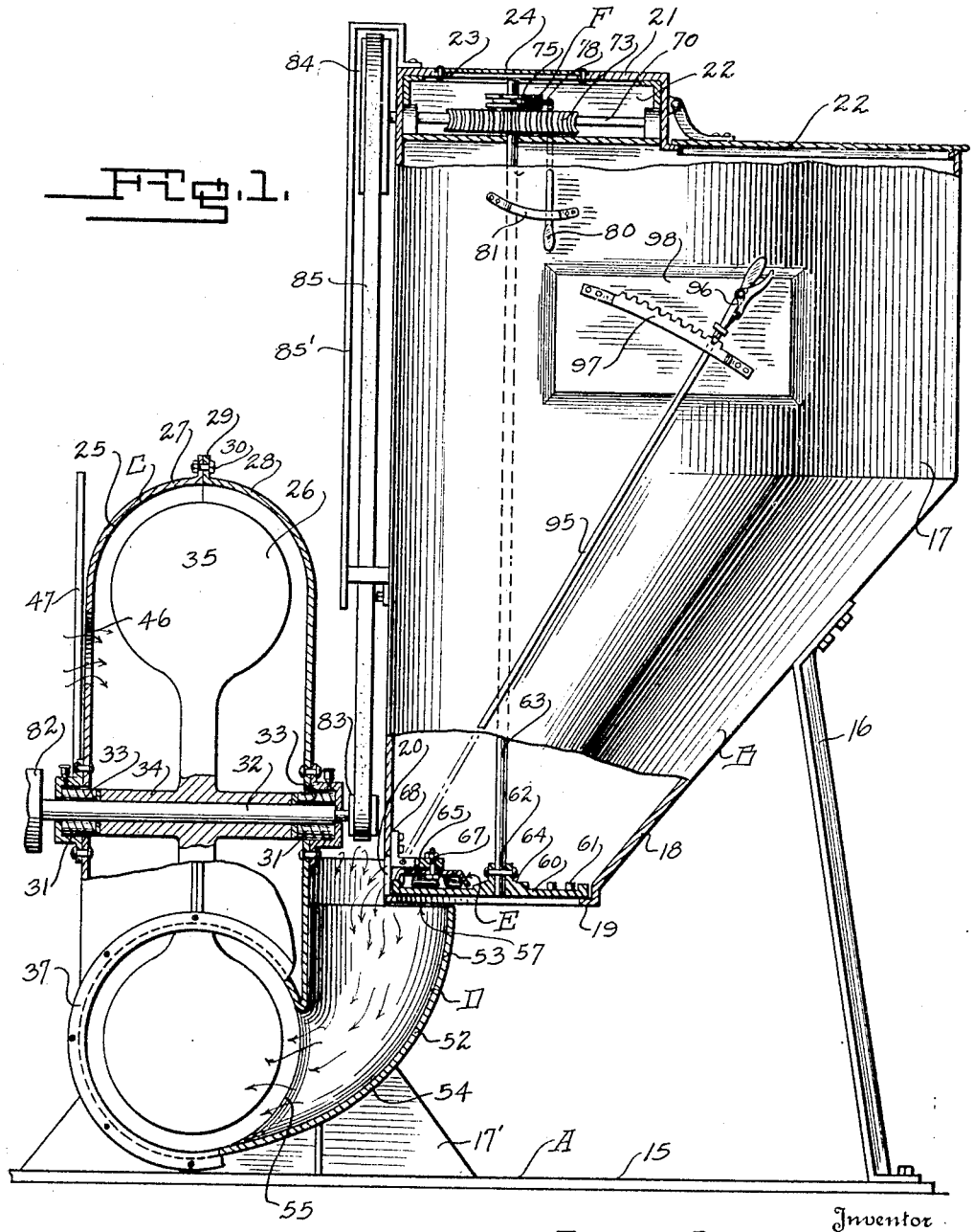

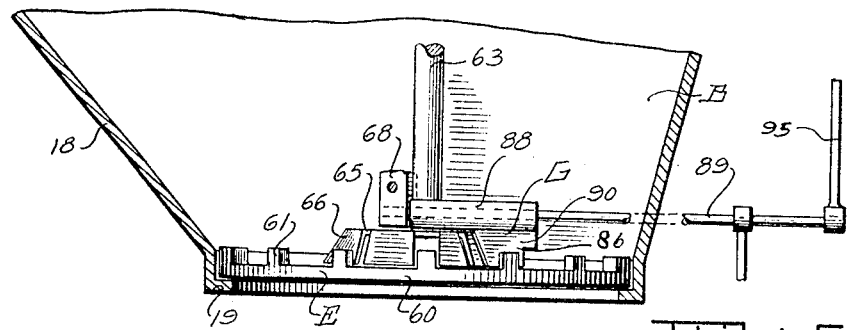
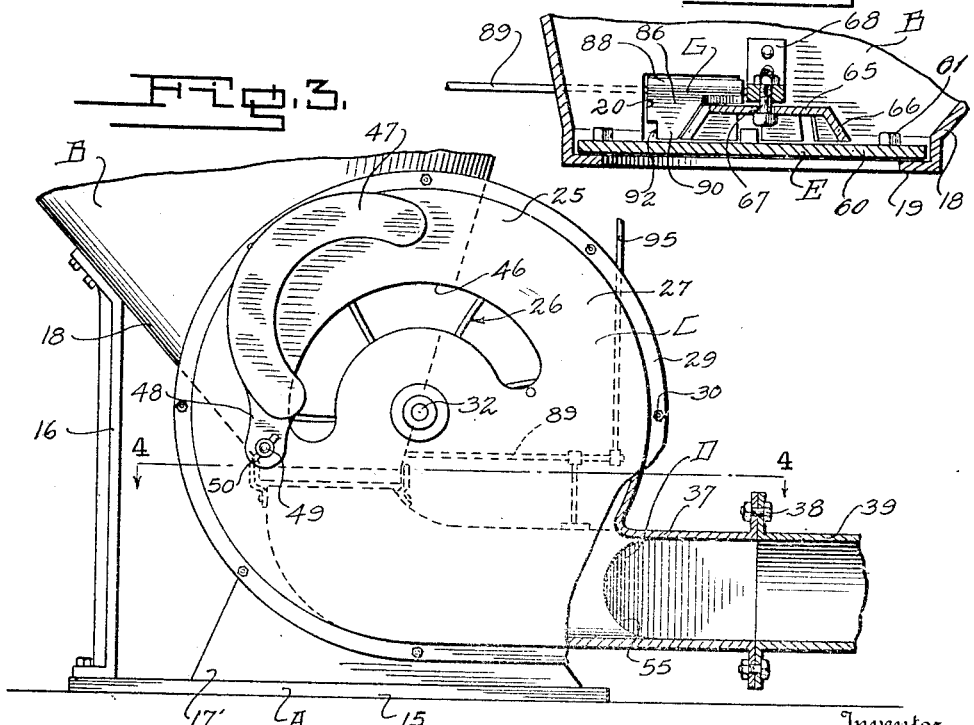

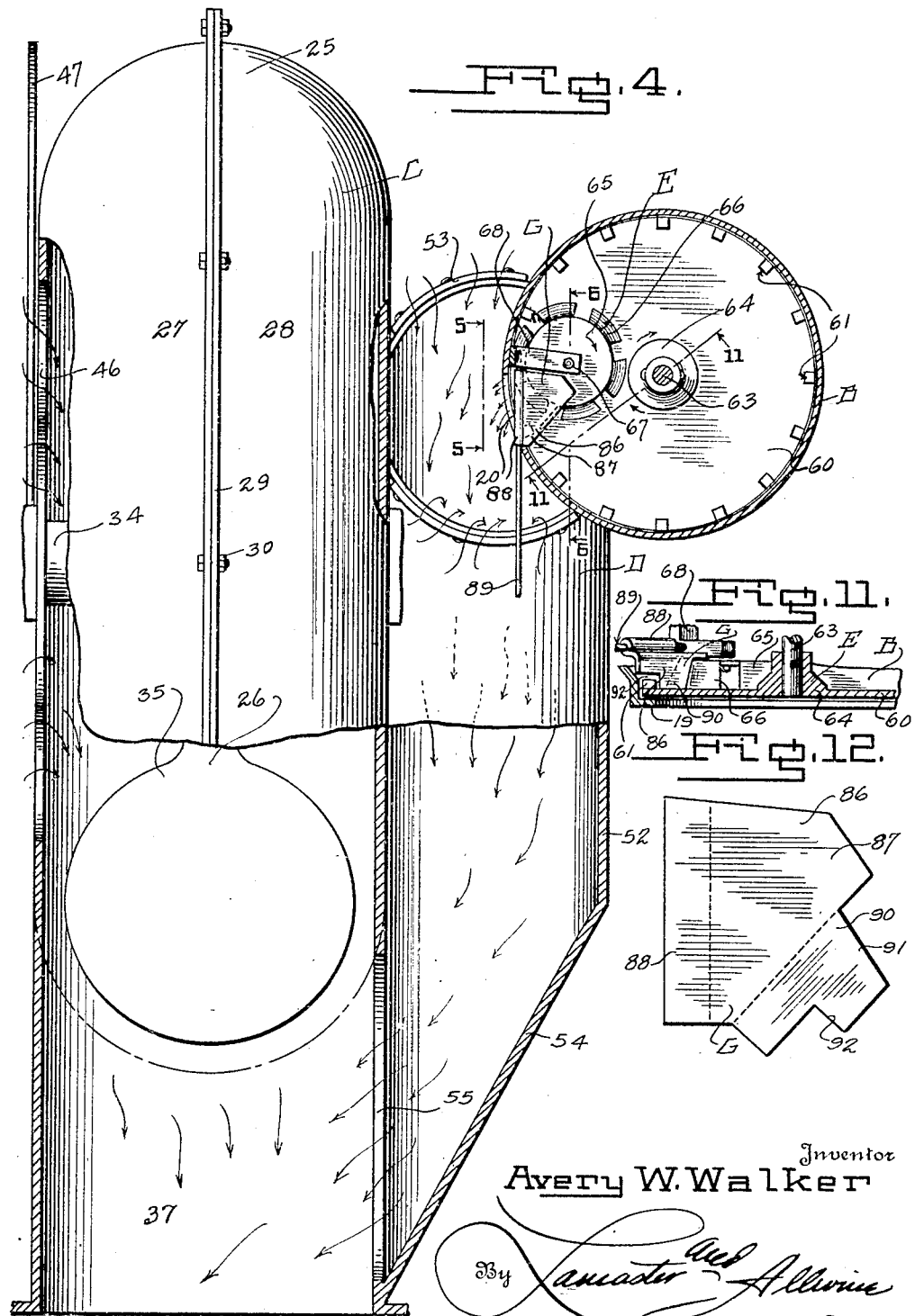

Patented Mar. 9, 1926.

1,576,076

UNITED STATES PATENT OFFICE.

AVERY W. WALKER, OF GASPORT, NEW YORK.

AIR-BLAST SPRAYER OR DUSTER.

Application filed June 12, 1922. Serial No. 567,808.

*To all whom it may concern:*

Be it known that I, AVERY W. WALKER, a citizen of the United States, residing at Gasport, in the county of Niagara and State of New York, have invented certain new and useful Improvements in Air-Blast Sprayers or Dusters, of which the following is a specification.

This invention relates to means for applying germicide or fungicide in powdered form upon trees, shrubbery, growing plants and the like to effectively destroy insects and fungous growths, which are detrimental to the proper propagation of trees, shrubbery and plants.

The primary objects of the invention are to provide, in an improved device, which is particularly adapted for dusting orchards: first, novel means for effectively and economically applying the powder; second, means for constructing the device so that the same will not corrode by the action of the germicide or fungicide thereon; third, a novel means for supplying the powder to the air blast in an even uninterrupted flow without the use of cumbersome brushes or feed chains; fourth, a novel means for constructing the air blower and the powder supplying means, whereby the powder does not pass through the fan or blower, thereby eliminating the danger of the device catching on fire, incident to the friction set up by the powder adhering to the side and fan blades of the blower, said novel means permitting the use of insecticide and fungicide such as sulphur which have heretobefore been considered dangerous to use with orchard dusters on account of fire; and fifth, novel means for controlling the operation of the means for supplying powder to the air blast in an even uninterrupted flow, and means for controlling the size of the opening between the hopper for the powder and the air blast.

A still further object of the invention is the provision of an improved orchard duster, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is an elevation of the improved duster, showing parts thereof in section.

Figure 2 is a fragmentary top plan view of the improved duster, showing parts thereof in section and broken away to illustrate the operation of certain parts thereof.

Figure 3 is a fragmentary side elevation of the improved orchard duster with parts of the delivery tube shown in section.

Figure 4 is an enlarged fragmentary horizontal section through the improved orchard duster, taken on the line 4—4 of Figure 3.

Figure 5 is an enlarged detail section taken on the line 5—5 of Figure 4, illustrating the novel and simple means employed for assuring a constant and even supply of the dusting material to the air blast.

Figure 6 is a section taken through the feeding mechanism for the dusting material taken on the line 6—6 of Figure 4.

Figure 7 is a detail vertical section taken on the line 7—7 of Figure 2, showing the control means for the powder supplying device.

Figure 8 is a similar section showing the control member in its raised or inoperative position.

Figure 9 is a detail horizontal section taken on the line 9—9 of Figure 7.

Figure 10 is a detail plan view of the removable plate carried by the upper wall of the hopper for covering the control mechanism for the said powder supplying device.

Figure 11 is a detail section, taken on the line 11—11 of Figure 4, through the supplying device for the powder.

Figure 12 is a plan view of the blank of the gate utilized for controlling the exit of the powder from the hopper to the air blast, and Figure 13 is a detail longitudinal sectional view through the novel nozzle carried by the delivery tube of the improved orchard duster.

Referring to the drawings in detail, wherein similar reference characters designate corresponding views, the latter A generally indicates the frame of the improved orchard duster; B, the hopper for receiving the germicide or fungicide to be sprayed on the trees or the like; C, the blower for forcing the powder on the trees or the like; D, the novel means of connecting the blower and hopper together; E, the means for supplying a constant and even amount of powder from the hopper B to the means D; F, the novel means for controlling the operation of the powder supplying device E; and G, the novel means for controlling the exit of the powder from the hopper to the said means D.

The frame A includes a base plate 15 on which is disposed the hopper B, the blower C, and the other part of the improved orchard duster. This base plate 15 can be secured in any preferred manner to a wheeled carrier (not shown) for permitting the duster to be easily drawn through an orchard between the rows of trees thereof. The wheeled carrier (not shown) may also have mounted thereon a prime mover (not shown) for actuating the improved orchard duster. As shown, the base plate 15 is provided with upwardly extending brackets 16 for holding the hopper B in position, and the fan or blower C can also be provided with a base 17' which can be connected in any preferred manner to the said base plate 15.

The hopper B can be made of any desired size and capacity, and is preferably formed of metal, which will not corrode under the action of the germicide or fungicide placed therein. This hopper includes a cylindrical body 17 having its lowered end gradually tapered as at 18. The lower end of the hopper B is left open and the wall of the hopper is provided with an inwardly extending annular flange 19 which supports a part of the powder supplying means E. The lower end of the hopper at one side thereof adjacent to the powder supplying means E is provided with an outlet opening 20, as clearly shown in Figures 1, 4, and 6 of the drawings.

The upper end of the hopper is provided with a rigid top wall 21 and a hinged cover plate 22, which permits the easy introduction of the insecticide or fungicide within the hopper and prevents the escape of the powder therefrom. It is preferred that the rigid wall 21 be struck up slightly, in order to form a housing 22, for the controlling means F for the constant supplying mechanism E for the powder. If so desired, the wall 21 can be provided with an opening 23 for exposing the said control mechanisms to permit the ready oiling thereof when desired or necessary. This opening 23 can be normally covered by a removable plate 24, which is clearly shown in Figure 10 of the drawings.

The blower C may be constructed or formed in the conventional manner, but as shown the same includes the casing 25, in which is rotatably mounted the fan 26. This casing 25 is preferably divided longitudinally to provide the two sections 27 and 28, which are provided with abutting flanges 29 which can be secured together in any preferred manner, such as by nuts and bolts 30. The casing 25 is provided at its axial center with bearings 31 for supporting the shaft 32 of the fan 26, and it is preferred that this shaft be mounted upon any suitable heavy duty roller bearings 33. The fan 26 includes the hub 34, which can be secured in any preferred manner to the shaft 32 and the radially extending blades 35. The lower end of the frame has communicating therewith the tangentially extending outlet pipe 37 to which can be bolted as at 38 the delivery pipe 39. This delivery pipe 39 can be made in the usual way and can have a portion of its length made flexible in order to permit the easy spraying of the powder on the trees being sprayed. The outer end of the delivery pipe 39 is provided with a novel shaped nozzle 40, which insures the breaking up of all of the particles of the powder and the constant even flow of the powder to the trees. As shown, the nozzle includes a pair of diverging arms 42 and 43, the terminals of which support the inwardly extending converging legs 44 and 45. These legs 44 and 45 terminate in relatively close proximity to one another, and thus it can be seen that as the powder is forced from the legs 44 and 45, the same will come into forcible contact thus causing the breaking up of all of the particles of the powder and insuring the delivery of the powder on the trees in a fine spray.

The blower C is disposed in relatively close proximity to the hopper B and is arranged at the lower end thereof. The side of the casing 25 of the blower C opposite to the hopper B may be provided with a regulative auxiliary air inlet 46. This inlet 46 is of substantially an arcuate configuration and may be closed or partially closed by means of a substantially semi-circular cover plate 47. This cover plate 47 is provided with an ear 48, which is mounted upon a pivot bolt 49 carried by the casing 25 of the blower C. This pivot bolt has threaded thereon a suitable thumb nut 50, by means of which the plate 47 can be held in an adjusted position with respect to the opening 46.

The means D for connecting the hopper B with the blower C, forms an important part of the present invention, in view of the fact that by said means D the powder to be sprayed or dusted upon the trees and the like, is not brought through the blower C, and thus all possibility of the powder adhering to the sides of the casing 25 and the fan blades 35 and the danger incident to this contingency is eliminated.

The means D consist of a conveyor tube 52, which is provided with an upwardly extending mouth 53 and a horizontally disposed longitudinally extending portion 54. The mouth 53 gradually decreases in diameter toward its lower end as clearly shown in Figure 1 of the drawings and the enlarged flared end thereof is left open as can be clearly seen by referring to this mentioned figure of the drawings. If so desired, the means D can be formed integral with the casing C as clearly shown in the drawings. The horizontally disposed portion 54 of the tube 52 extends parallel with the outlet portion 37 of the blower and communicates therewith as at 55 at a point forwardly of the fan 26.

It can be seen that by this construction, when the blower is in operation, a blast of air will be forced through the outlet 37 and into the delivery pipe 39. As this blast of air rushes past the opening 55, a suction or partial vacuum will be formed in the means D, thus causing the sucking in of any powder or air which may be in the said means D. The upper end of the said means D is notched as at 57 for receiving a portion of the lower end of the hopper B and by referring to Figure 1 of the drawings, it can be seen that the opening 20 formed in the hopper is disposed in the upper end of the said means D. As the upper end of the means D is left open, it can be seen that air will be sucked into the said means D as well as the powder from the hopper B thus causing an intermingling of the powder and air at this point.

The novel means E provided for insuring the even and constant supply of powder to the means D includes a relatively large disc 60 which fits upon the flange 19, closes the lower open contracted end 18 of the hopper B and receives the powder upon its upper face. This disc 60 has its marginal portion provided with spaced crown teeth 61 and its axis provided with an opening 62 for the reception of the operating shaft 63, which forms a part of the drive mechanism therefor. It is preferred that the axial center of the disc be provided with an inclined or conical shaped hub 64 in order to guide the powder toward the periphery of the disc and prevent the powder from clinging about the operating shaft 63. Disposed above disc 60, in a plane parallel thereto and adjacent to the opening 20 is a disc wheel 65 having a diameter considerably smaller than the diameter of the disc 60, and this disc wheel is provided at its periphery with depending outwardly flared blades 66. These blades 66 are spaced a distance apart equal to the width of crown teeth 61 and during the rotation of the disc 60, the teeth 61 are adapted to rotate the disc wheel 65 by engagement with the blades 66. This disc wheel 65 is mounted at its axial center upon a supporting shaft or bolt 67, which can be carried by a hanger or bearing bracket 68. This bearing bracket 68 is secured to the wall of the hopper B directly above the opening 20. The disc 60 is adapted to be driven in a clockwise direction as is the wheel 65, and it can be seen that during the operation of the disc 60 and the disc wheel 65, that the dust or powder coming upon the faces of these discs will be carried in a constant even flow through the opening 20.

The operating and controlling means F for the constant supply means E for the germicide or fungicide powder includes a drive shaft 70, which can be mounted in suitable bearings 71 disposed within the compartment or casing 22. This shaft 70 has keyed or otherwise mounted thereon a worm 72 which meshes with a worm wheel 73 rotatably mounted upon the operating shaft 63. The casing 22 can be provided with side walls 74 which conform to the configuration of the gears 72 and 73. If desired, the whole casing can be made liquid tight so that these gears may run directly in oil. Slidably mounted upon the shaft 63 for rotary movement therewith is the clutch section 75, which is provided with depending teeth 76 which are adapted to fit within openings 77 formed in the gear 73. It can be seen that when the teeth 76 are in the openings 77, that rotary movement will be transmitted to the shaft 63 upon the driving movement of the shaft 70. This clutch section 75 is provided with a yoke 78, which is secured in any preferred manner to an operating rod 79 which extends exteriorly of the hopper B. This operating rod 79 is provided with a hand lever 80 to facilitate the turning thereof, and it can be seen that by suitable movement of the hand lever 80, the clutch section 75 can be moved into and out of engagement with the worm wheel 73. A suitable guide 81 can be provided for the hand lever 80, and if desired, means can be provided for holding the hand lever 80 in locking engagement with the guide 81. The shaft 32 of the blower C can have the outer terminal thereof provided with a pulley 82, which can be operatively connected to a prime mover of any preferred type (not shown). The inner end of the shaft 32 is provided with a pulley 83, which is in alignment with a relatively large pulley 84 secured in any preferred manner to the drive shaft 70. The pulleys 83 and 84 have trained about the same a drive pulley belt 85. Thus, it can be seen that when the blower C is driven, the drive shaft 70 will be driven therewith.

The means G for controlling the exit of the dusting powder from the hopper B into the means D comprises a gate 86, which is preferably made from sheet metal suitably treated to prevent corrosion. The gate can be formed of a single blank of material and consists of a top plate 87 of a substantially triangular configuration having formed on its rear edge a flange, which can be rolled to provide a hub 88 for the reception of an operating rod 89. This hub 88 can be secured to the operating rod 89 in any preferred manner. One end of the plate 87 is provided with a depending flange 90, which forms a main part of the gate. This flange 90 is provided with an inclined edge 91 which conforms to the inclination of the blades 66. The lower edge of the flange 90 at the outer corner thereof is provided with a notch 92, which permits the passage of the crown teeth 61 past the gate at all times. It can be seen that when the gate 86 is in its lower position, the flange 90 will be in such a position as to lie in front of the opening 20 and thus effectively prevent the passage of the powder through the said opening. By regulating the distance of the flange 90 from the disc 60, the amount of the powder passing through the opening 20 can also be regulated. The rod 89 extends outwardly of the hopper B and is provided with an operating lever 95 carrying a pawl 96 which is adapted to engage a sector rack 97 secured to the hopper B for that purpose. This permits the gate 86 to be held in any preferred adjusted position. If so desired, a suitable base plate 98 can be provided for the sector rack 97 in order that the same can be firmly secured to the cylindrical portion 17 of the hopper.

In order to prevent the operators of the machine from coming in contact with the belt 85, a suitable guard 85' can be provided therefor. This guard 85' can be secured in any preferred manner to the hopper as clearly shown in Figure 1 of the drawings.

In operation of the improved machine, the desired amount of powder is placed within the hopper B, after which the vehicle upon which the machine is mounted is moved between adjacent rows of trees of the orchard, and the blower C is set in operative position. This will cause a suction within the means D for drawing the powder dropped therein into the delivery tube 39.

After the blower C is set in operation, the hand lever 80 may be operated so as to move the clutch section 75 into locking engagement with the worm wheel 73, which of course, will set in operation the powder dropping means E. The gate G can be suitably controlled by the lever 95 in order to allow the desired amount of the powder to be fed into the means D.

When it is desired to stop the feeding of the powder without the stopping of the blower C it is merely necessary to actuate the hand lever 80 to raise the clutch section 75 from out of engagement with the worm wheel 73, which of course, will effectively prevent operation of the operating shaft 63.

From the foregoing description, it can be seen that a novel and simple orchard duster has been provided, in which a novel means has been provided for supplying and controlling the amount of powder delivered to the air blast, and a novel means for introducing the powder into the air blast whereby the same will not be passed directly through the blower for the said machine.

Changes in details may be made without departing from the spirit or scope of this invention; but,

I claim:

1. In a dusting machine, the combination of a hopper for the powder to be sprayed, having a delivery opening, a blower including a fan, and a suction tube communicating at one end with the blower at a point outwardly of the periphery of said fan and at the other end with the atmosphere exteriorly of said hopper and the delivery opening of said hopper.

2. In a dusting machine, the combination of a hopper for the powder to be sprayed, having a delivery opening, a blower having a regulative air inlet and including a fan, and a suction tube communicating at one end with the blower at a point in advance of said fan and at the other end with the atmosphere exteriorly of said hopper and the delivery opening of said hopper.

3. In an orchard duster, a hopper having its lower end contracted and provided with an outlet opening, a blower including a housing, a rotary shaft extending through the housing and a fan wheel carried by the shaft within the housing, a suction pipe extending along the blower and communicating therewith at a point in advance of the fan, the upper end of the suction pipe being open to the atmosphere and receiving the portion of the lower end of the hopper provided with the outlet, means for delivering the powder from the hopper through the outlet opening thereof into said suction pipe, and motion transmitting means operatively connecting said last mentioned means with the fan shaft for operation therefrom and including a clutch mechanism.

4. In an orchard duster, a hopper having an opening in its lower end, a blower including a fan wheel and a delivery pipe, and a suction pipe extending parallel with the blower and delivery pipe and communicating with the delivery pipe at a point in advance of and adjacent to the fan wheel, the suction pipe having an upwardly extending mouth receiving only the portion of the lower end of the hopper having said opening, and being also open to the atmosphere laterally of said hopper, 5. In a machine for dusting trees, shrubbery and plants, a hopper, a blower including a casing divided longitudinally to provide a pair of sections, means for connecting the sections together, one of the sections having an air inlet opening therein, means for controlling the effective size of said opening including a swinging plate, a suction pipe formed integral with the other section communicating with the blower at a point in advance of the fan portion of the blower, the upper end of the suction pipe being flared, a portion of the lower end of the hopper being disposed within a portion of the suction pipe, the mentioned portion of the hopper having an opening therein, means for feeding powder through the opening, means for controlling the effective size of the opening, and means for operatively connecting the blower and the powder feeding means together.

6. In a dusting machine, a blower housing having inlet and outlet openings, a fan operating in the blower housing between the inlet and outlet openings thereof, a suction tube having one end communicating with the blower housing intermediate the outer periphery of the fan and outlet opening and having its other end open to the atmosphere whereby air may be sucked through the suction tube into the blower housing, and means for delivering a powder into the suction tube adjacent the open air inlet end thereof.

7. In a device of the class described a blower including a housing provided with an outlet opening and a fan operating in said housing, said housing having a transverse opening therein adjacent said outlet opening and located adjacent the outer periphery of said fan, and means for feeding a germicide thru said transverse opening of the housing into the blower housing between the outer periphery of the fan and the outlet opening, whereby incident to fan operation said germicide will be directed thru said outlet opening without contacting with said fan.

AVERY W. WALKER.